Patented May 26, 1931

1,806,688

UNITED STATES PATENT OFFICE

LEONARD R. HOWES, OF AKRON, OHIO, ASSIGNOR, BY MESNE ASSIGNMENTS, TO MILLER RUBBER COMPANY, INC., OF WILMINGTON, DELAWARE, A CORPORATION OF DELAWARE

METHOD OF MAKING ORNAMENTAL RUBBER BALLS

No Drawing.    Application filed October 4, 1928.    Serial No. 310,439.

My said invention relates to an improved method of manufacturing rubber balls having a marbleized or vari-colored surface. Such balls have been customarily made, in the factory in which applicant is employed, by the use of machines such as disclosed in Letters Patent, No. 1514183, dated Nov. 4, 1924, and No. 1624849, dated April 12, 1927, wherein two sheets have circular portions progressively cupped and died together to form "biscuits" containing a blower, these biscuits being placed in molds for curing.

In the manufacture of marbleized balls, if the sheets were composed wholly of marbleized stock, a great amount of waste would ensue as the scrap left by dieing out the disks could not be reused as in the reworking the colors would flow or mix and result in a grey color. It has therefore been the custom to produce as by calendering or extruding a relatively thick sheet of base stock and a thin veneer sheet of marbleized stock which were run together into laminated sheets which were used to produce the biscuits, the scrap being reworked for base stock.

Considerable trouble and expense has been experienced in thus proceeding as it has been found that a considerable percentage of the biscuits become egg shaped before they are placed in the molds, resulting in imperfect or lop sided balls.

I have discovered that this defect can be overcome by first cooling the veneer and base sheets before they are superposed, and thereafter forming the biscuits and resulting balls in the manner described, and my invention includes this novel process as hereinafter more fully described and defined in the appended claims.

In proceeding according to my invention, I form a base sheet of suitable stock and of desired thickness according to the size and character of the ball, and also a thin veneer sheet of the marbleized or vari-colored stock, the sheets being formed in the customary manner as by calendering or extruding. Instead of running these directly together as has been customary, to produce a laminated sheet, I allow them both to thoroughly cool and then superpose the veneer sheets on the base sheets and thereafter pass the compound sheets through the ball machines to produce the biscuits which I have found are always of uniform shape.

I have discovered that the cause of distortion by the old method was due, apparently, to a difference in shrinkage of the relatively thick and thin stocks and that by previously cooling the stocks (before assembly), no such differential shrinkage occurs as the biscuits made according to my improved method are of uniform shape and invariably free from distortion.

I have found that no particular care is necessary in juxtaposing the sheets, and that the veneer sheet can be simply patted down by hand, thus avoiding the necessity of machine rolling.

The preferred manner of cooling the sheets is to book them upon muslin sheets carried by suitable frames and allow them to stand until thoroughly cool, whereupon they are removed and superposed as described.

Having thus described my invention, what I claim is:

1. The hereindescribed method of making rubber balls having ornamental veneered surfaces, which consists in producing a plurality of sheets of thin and thick stock, respectively, thoroughly cooling the sheets separately, thereafter superposing said sheets one on the other to produce laminated sheets, and forming the balls from said laminated sheets, the balls being formed by joining cupped portions of the laminated sheets.

2. The method of making uncured "biscuits" for use in the manufacture of rubber balls which consists in producing sheets of respectively thick base stock and thin vari-colored stock, cooling said sheets separately, thereafter superposing the thin sheets on the base sheets to produce laminated sheets, stretching the laminated sheets to form cupped areas and dieing cupped portions of the two such laminated sheets together to produce the "biscuits."

In testimony whereof, I affix my signature.

LEONARD R. HOWES.